Oct. 4, 1932.   K. W. ROHLIN   1,880,213
FLUID CONTROLLING MEANS
Filed July 16, 1927   6 Sheets-Sheet 1
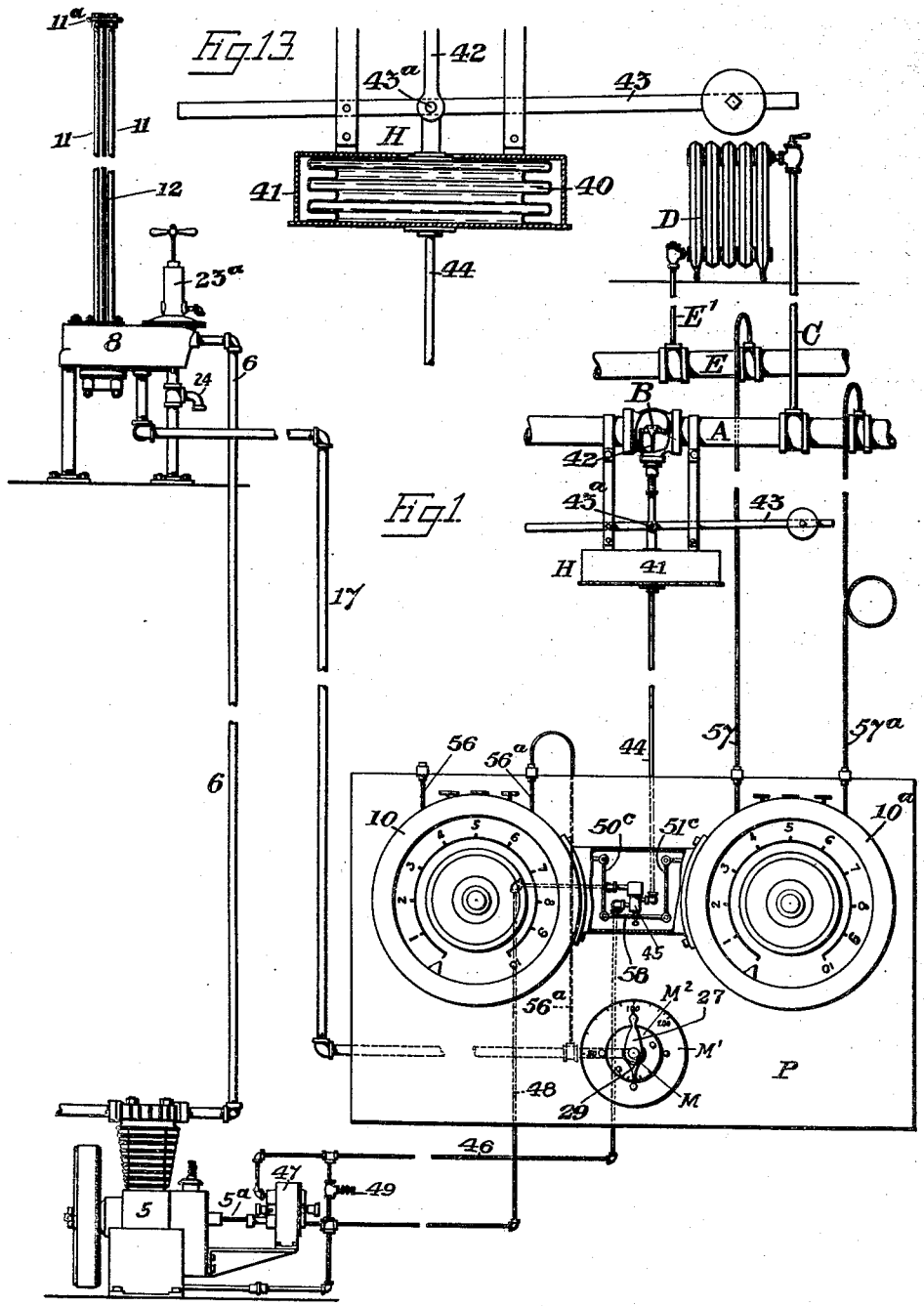
Inventor:
Karl W. Rohlin,
by Murray C. Boyer
Atty.

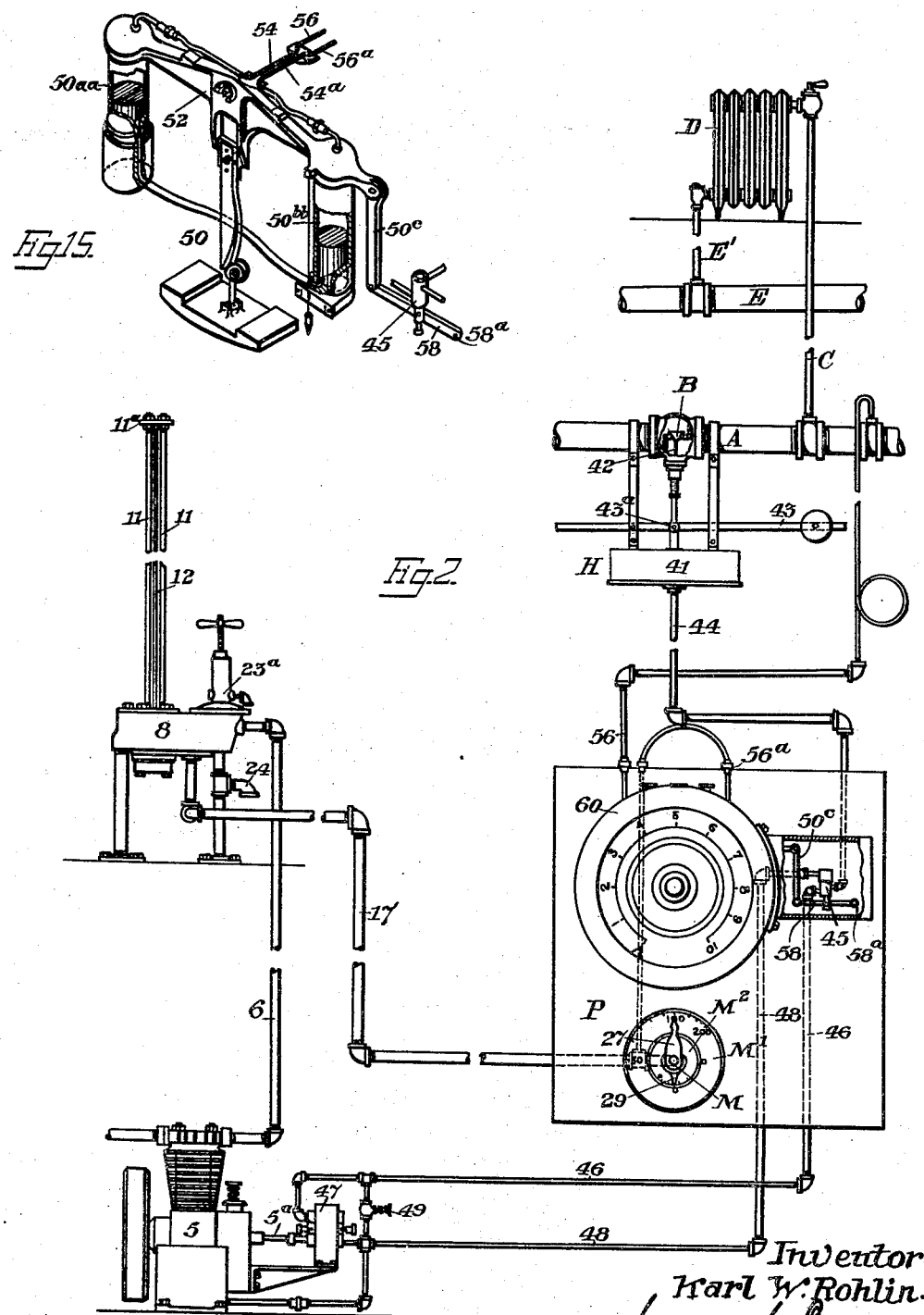

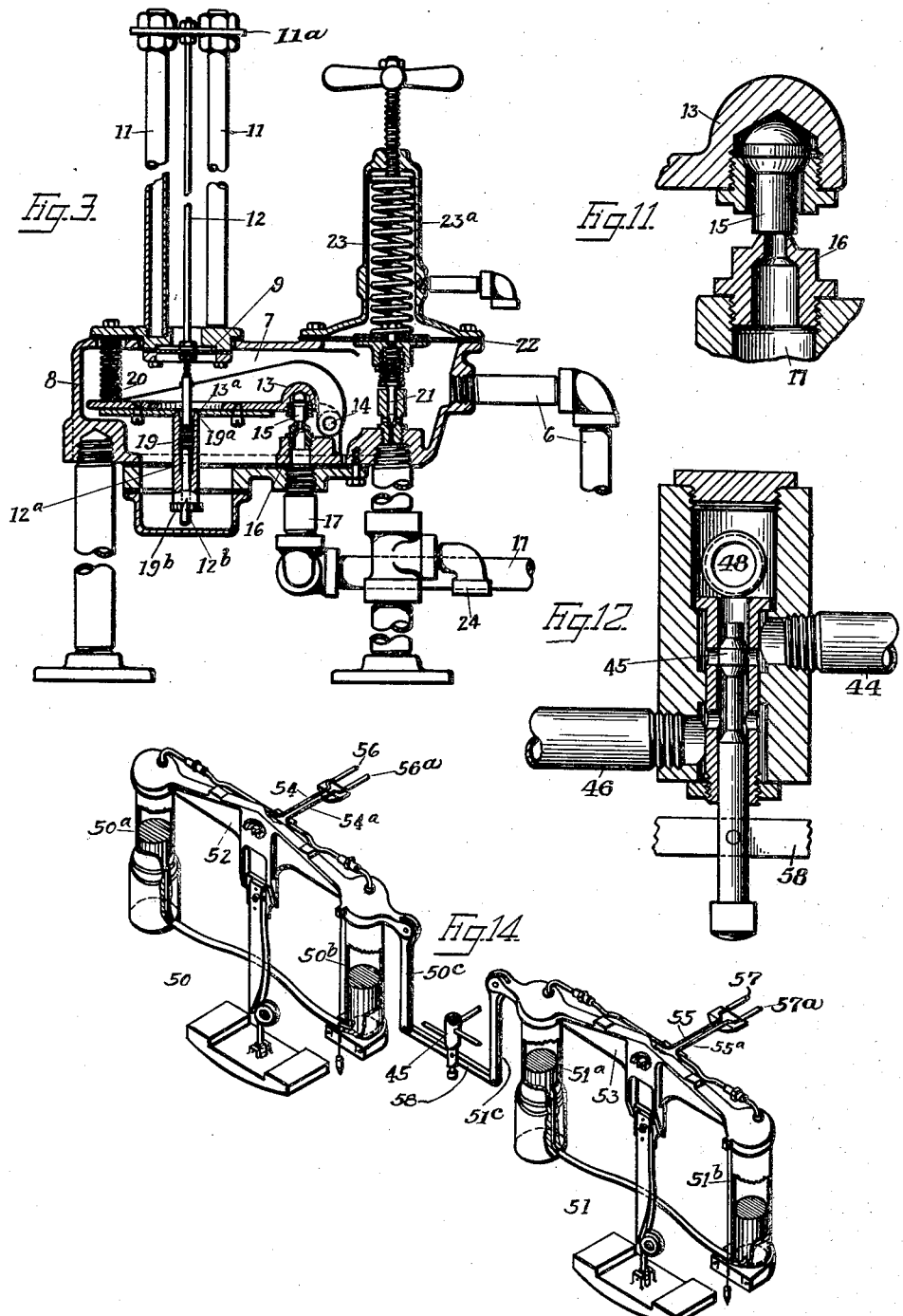

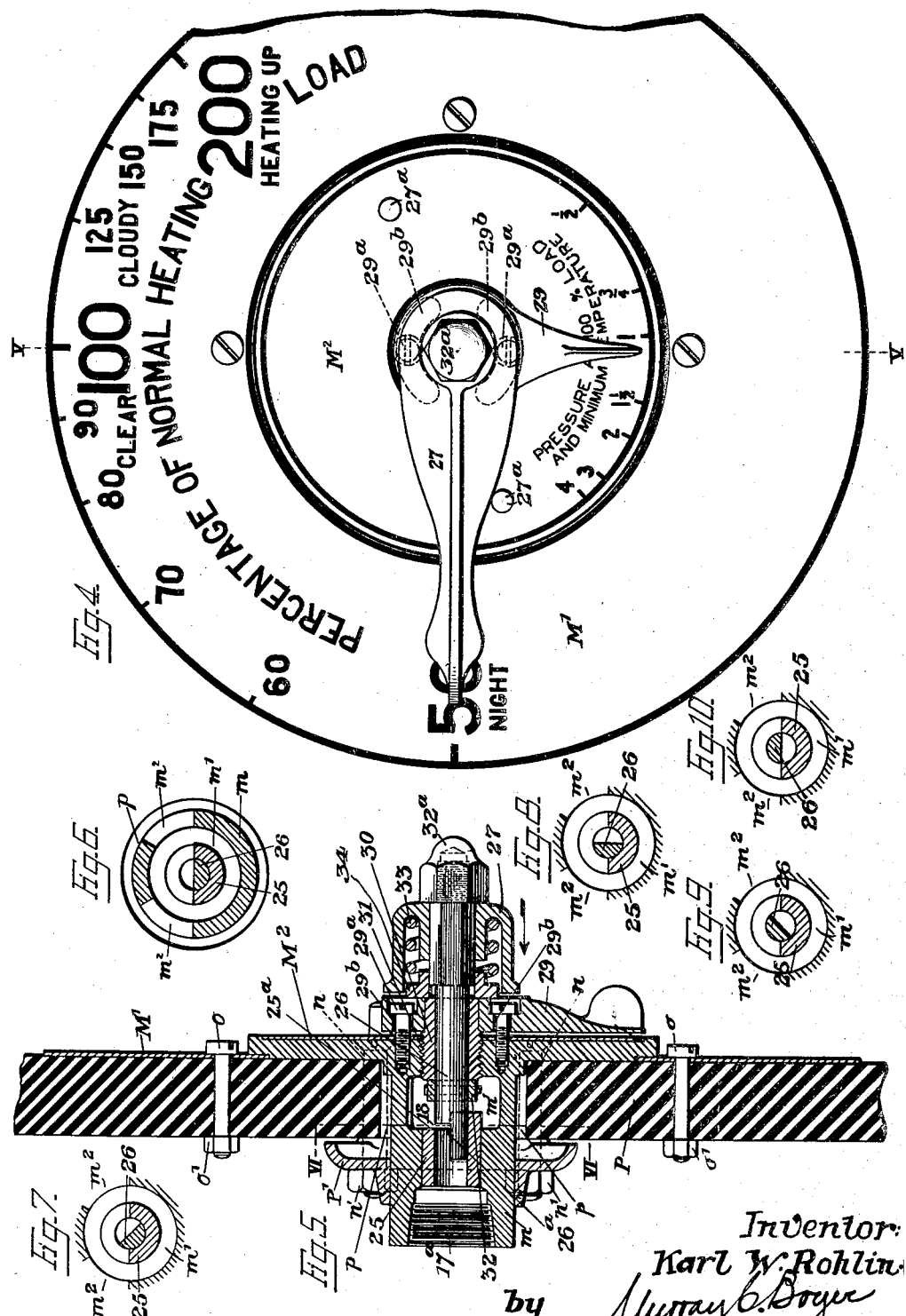

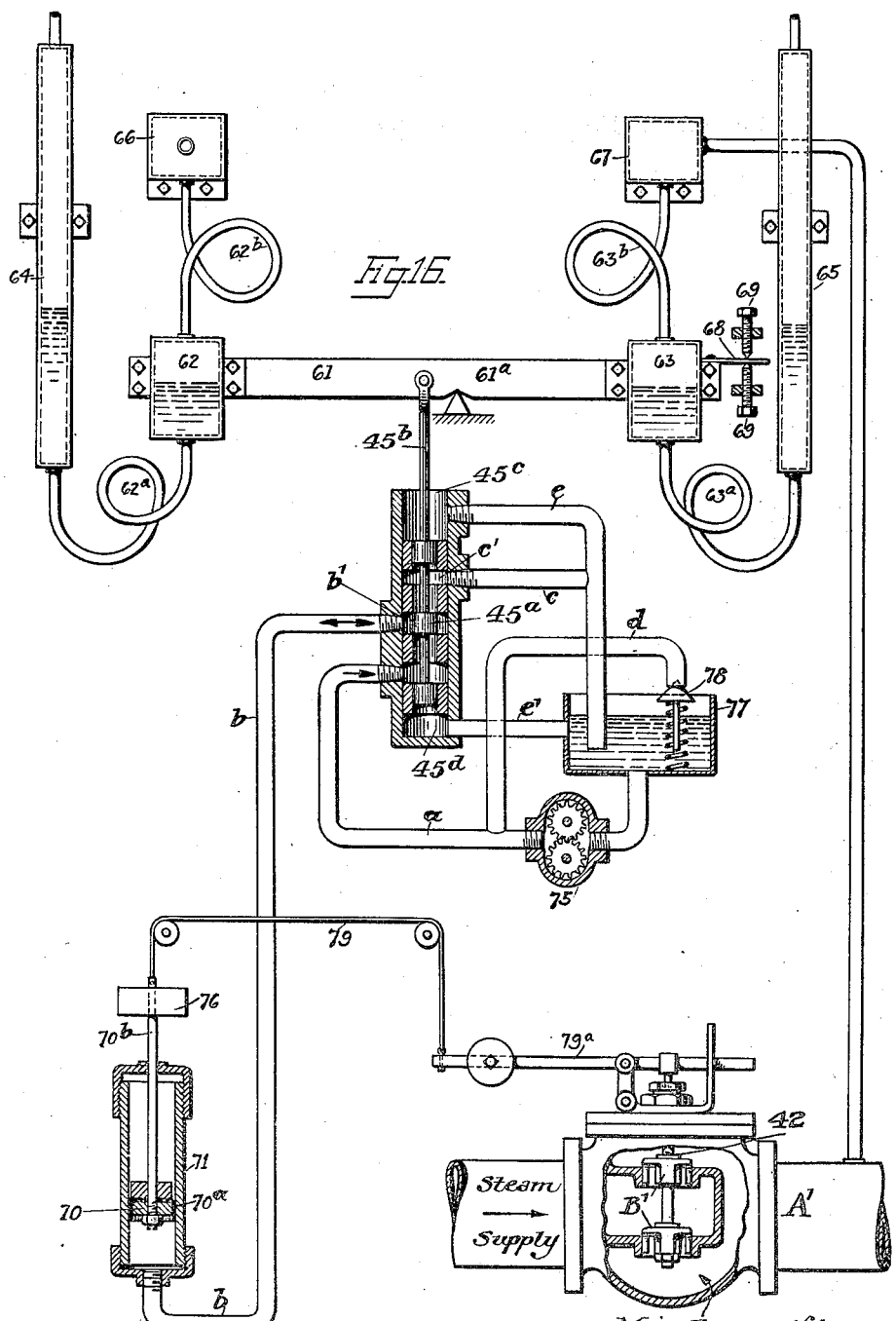

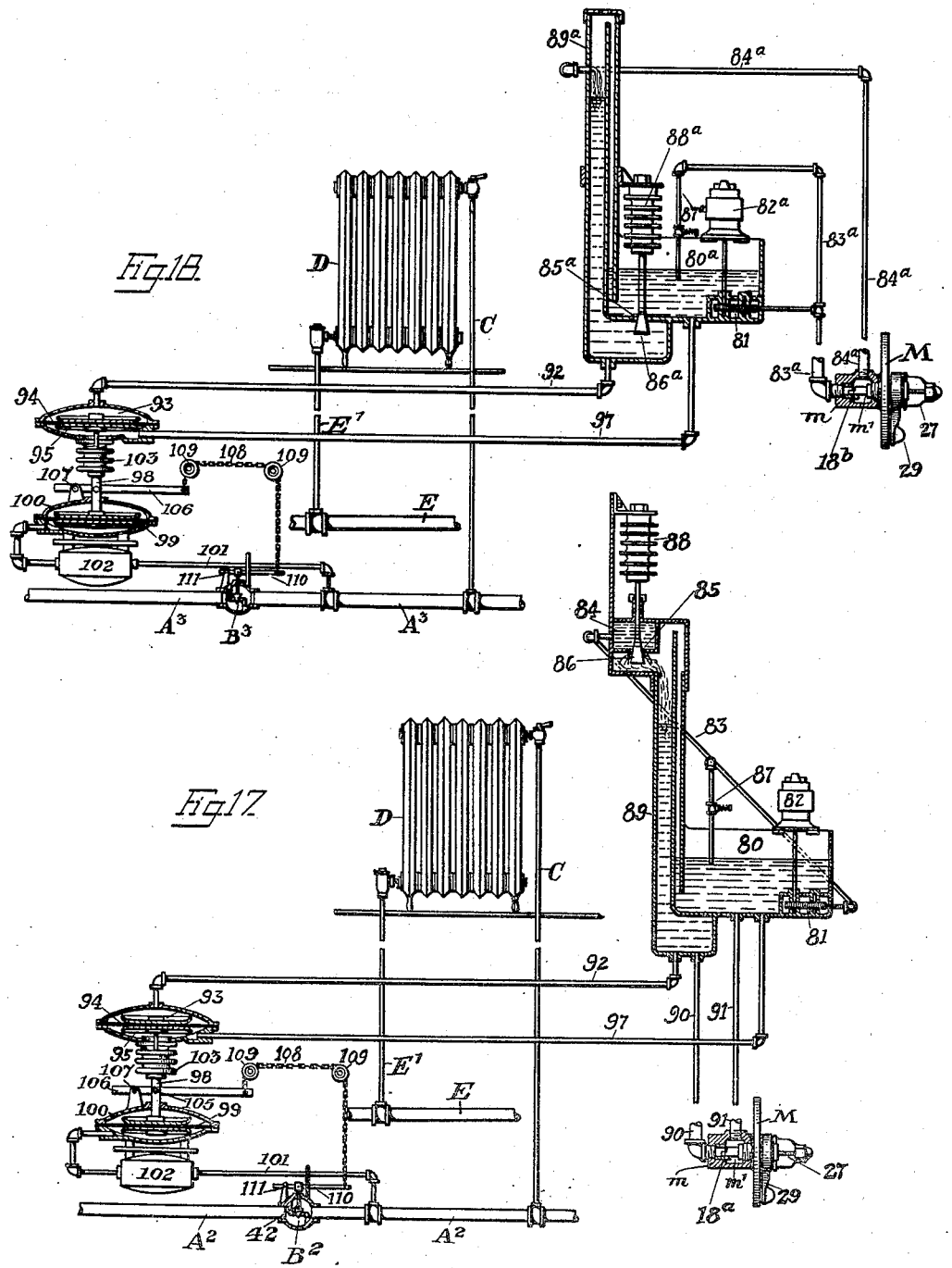

Patented Oct. 4, 1932

1,880,213

UNITED STATES PATENT OFFICE

KARL W. ROHLIN, OF MERCHANTVILLE, NEW JERSEY, ASSIGNOR TO WARREN WEBSTER & COMPANY, OF CAMDEN, NEW JERSEY, A CORPORATION OF NEW JERSEY

FLUID CONTROLLING MEANS

Application filed July 16, 1927. Serial No. 206,352.

My invention relates to fluid controlling means more particularly designed for but not limited to a control which may be employed in connection with the heating of buildings and other spaces by steam or other circulating heating media.

One object of my invention is to provide means, including a thermostat which may be located externally or internally of the building or other space to be heated, whereby automatic control of a fluid medium, for instance the steam pressure necessary for the proper heating of the building or other space, may be effected; such means including a pressure sensitive device (or devices) responsive to changes in pressure of a fluid medium under the control of or responsive to the movements of such thermostat, as well as changes in the pressure of the fluid (the heating medium for instance) whose pressure is under control.

A further object of my invention is to provide means which will effect control of the fluid (steam) delivered into each section of a building or other space whose temperature is to be modified, or each radiator when a heating medium is under control, by varying the pressure in the supply main regardless of the pressure in any form of return main.

A further object of my invention is to so arrange my improved controlling device that the proper amount of the heating agent may be delivered to each section of a building or other space to be heated or each radiator even though the pressure of the heating agent delivered to the control valve by the supply main, or the pressure in the return mains, fluctuates through small limits.

And a still further object of my invention is to provide a controlling device of such character that the thermostatic controlling element (or elements) may be located at any point desired; on the roof, or at any other point outside the building or other space to be heated, or at any point inside the building or other space to be heated, while the pressure controlling device and the means for manually-altering the position of the same or any element thereof to affect the amount of the heating agent delivered; for heating up, night load, etc., may be located in the basement or at any other convenient point of remote control without in any way affecting the accuracy or dependability of the complete structure.

These and other features of my invention are more fully described hereinafter; reference being had to the accompanying drawings, in which:

Figure 1 is a view in elevation, more or less diagrammatic in character, of one form of fluid pressure controlling mechanism within the scope of my invention.

Fig. 2 is a similar view illustrating another form of fluid pressure controlling mechanism within the scope of my invention.

Fig. 3 is an elevation, partly in section, of the thermostatic device, including the thermostatically controlled valve, which may be employed in connection with the controlling devices illustrated in Figs. 1 and 2.

Fig. 4 is a view in elevation of the manual control mechanism for effecting adjustment of an orifice modifying the pressure for regulating the delivery of the desired quantity of a fluid body.

Fig. 5 is a sectional elevation on the line V—V, Fig. 4.

Fig. 6 is a cross sectional view on the line VI—VI, Fig. 5.

Figs. 7, 8, 9 and 10 are sectional views similar to one portion of Fig. 6, illustrating the manner of effecting one adjustment of a member controlling the size or area of the modifying orifice.

Fig. 11 is an enlarged sectional view of the thermostatically controlled valve shown in Fig. 3.

Fig. 12 is a sectional elevation of one form of pilot valve, under the control of pressure sensitive means, for directing fluid to motor means for operating a master control valve.

Fig. 13 is an enlarged sectional view of the motor means shown in Figs. 1 and 2, for operating the master control valve.

Fig. 14 is a perspective view, partly in section, of a duplex form of pressure sensitive means which may be employed with the form of control mechanism illustrated in Fig. 1, for operating the pilot valve.

Fig. 15 is a perspective view of single pressure sensitive means of the type illustrated in Fig. 14, which may be employed in the form of control apparatus shown in Fig. 2, for operating the pilot valve.

Fig. 16 is a view in elevation, partly in section and more or less diagrammatic in character, of another form of pressure sensitive means within the scope of my invention, which may be employed to operate the pilot valve.

Fig. 17 is a view in elevation, more or less diagrammatic, of a pressure controlling device in which a body of liquid under the influence of thermostatic means effects the operation of a pressurestat which in turn serves as the motor means for operating a master control valve, and Fig. 18 is a similar view illustrating a modified arrangement of the controlling means shown in Fig. 17.

The controlling means forming the subject of my invention may be employed generally for controlling the flow of a primary fluid wherein advantage is taken of an artificial pressure delivering a secondary body of fluid the volume or quantity of whose flow is influenced by and directly responsive to changes in temperature. In the present instance I have shown fluid controlling means employed in coordination with a heating system; such means having been designed more particularly for use with a steam heating system having orifices disposed at the proper points to automatically maintain on the piping of such system, and/or said orifices, a pressure sufficient to deliver the necessary or proper quantity of steam or other heating medium to the space or spaces to be heated, or each radiator supplied, whereby such space or spaces of a building or other structure may be heated approximately to a temperature of 70° F. As an instance of a steam heating system of the orifice type, and to which my improved controlling means is particularly adapted, I may refer to that disclosed in the application of J. A. Donnelly, filed June 18, 1924, under Serial No. 720,829, now Patent No. 1,681,725, issued Aug. 21, 1928.

The quantity of steam delivered to each radiator is automatically varied by the effect upon controlled devices of changes in the temperature of the air or other fluid surrounding the thermostat which in turn affects pressures in the mains and upon the piping and orifices of the radiators included in the heating system. In like manner the controlling means may be so adjusted that some other quantity of steam (or other heating medium) may be fed to the radiators to suit a special condition; for instance, for the initial heating of a building or other space, or for maintaining its temperature at some point below 70° F., (or at any other temperature desired) when unoccupied, or for any other reason.

One of the advantages of the type of control forming the subject of my invention is that the heating of independent radiators is but slightly influenced by the opening or closing of the valves of other radiators in the same system, and unaffected by variations in the amount of steam fed into the system from some source not controlled by the master control valve; such, for instance, as exhaust steam from auxiliary turbines, pumps, blowers, or the like.

The improved controlling device forming the subject of my invention and designed to effect the above-named advantages accomplishes the desired result by simple and positive means and is designed to control the pressure and, through such control of the pressure, to regulate the quantity of steam or other heating medium delivered. Generally stated, the function of this control is to provide and maintain such difference in pressure between the supply and return mains of a heating system that the amount of steam or other heating agent fed into each radiator through its orifice will be the amount required to heat the building or other space to the desired temperature.

While in general my improved controlling device will function better with a heating system having orifices because of a more uniform distribution attained throughout the building, entirely satisfactory results can be attained in a system having its piping of such accurate internal dimensions that the friction losses throughout the system are uniform. In cases where accurate distribution is unnecessary, the controlling device will function properly in delivering the correct amount of steam to the building or other space to be heated, but the distribution may be such that one part of such space or building may be heated more than some other part.

The important elements of my improved controlling device, are as follows:

(1) A thermostat, influenced by some controlling temperature, and located outside or inside the building or other space to be heated.

(2) A fluid or liquid circulating and controlling device, adapted to produce a pressure or head equal to the amount desired in the supply mains to effect a proper delivery of the heating agent, which may be steam, to the radiators to heat the building or other space substantially to the temperature desired, and controlled by the thermostat.

(3) A pressure sensitive device responsive to both the fluid pressure of the circulating device and the pressure in the heating agent supply main and/or return mains; such device serving to operate, directly or indirectly, a valve, which may be located in the supply main for controlling the amount of the heating agent passing therethrough for delivery to the system.

The thermostat may be of any suitable form or type, whose motion may be proportional to changes in the temperature of the air surrounding the same; that illustrated in Figs. 1 and 2, of the accompanying drawings being a bi-metal element in which the differences in expansion of the respective metals serve to operate a valve controlling the flow of a circulating fluid, (gas or liquid), in such manner that the area of such valve opening varies with the motion of the thermostat in such manner as to produce the proper fluid flow.

An important feature of the improved control apparatus forming the subject of my invention is the fluid (gas or liquid) circulating and controlling device influenced by the thermostat, the function of which is to determine the pressure necessary in the supply main and/or the return mains, to deliver steam or other agent for the proper heating of the building with respect to outside or other temperature conditions.

In that form of my improved control apparatus more or less diagrammatically illustrated in Fig. 1, the supply main for the heating medium, which may be steam or other agent, is indicated at A, and contains a master control valve B, controlling the flow of such heating medium. From this supply main risers, such as indicated at C, may extend to various radiators located in various parts of the building or other space to be heated, one of which is indicated in the drawings as connected to a radiator D. A return line is indicated at E, with the usual connection, indicated at E', between the same and the radiator D, and it will be understood, of course, that similar connections are provided for the several radiators disposed throughout the building. The master control valve B regulates the flow of the heating medium whose pressure is determined by the position of said master control valve, which is under the control of the mechanism forming the subject of my invention.

The thermostatic device of the controlling means illustrated in Figs. 1 and 2, shown more particularly in the sectional view, Fig. 3, controls the rate of flow of a fluid body, which may be compressed air, supplied by a compressor 5, via pipe 6, and delivered to a chamber 7, provided by a casing 8 of the thermostatic device; discharge of such air to a manual control element, indicated at M, being under the direct control of the thermostat.

The thermostatic control mechanism, in which the operating element is preferably of the bi-metal type, may include a flexible wall or diaphragm 9, mounted in the upper wall of the casing 8 providing the chamber 7; a plurality of bars (or tubes) 11, in the present instance three, outwardly disposed and of one character of metal rigidly connected at their lower ends to said casing 8, and at their upper ends to a plate 11$^a$, with a fourth bar 12, of a different metal and having a different coefficient of expansion and contraction, also rigidly connected to the plate 11$^a$. The lower portion of the bar 12, which may be centrally disposed with respect to the bars 11, passes through and is connected to the flexible wall or diaphragm 9, in the upper part of the casing 8. The lower end 12$^a$ of the bar 12 is connected to a lever 13, fulcrumed at 14, and carrying a valve 15, normally located over a discharge outlet 16, at the upper end of a pipe or conduit 17, leading to a manually controlled outlet port 18, forming part of the manual control element M, more particularly referred to hereinafter. The rod 12 of the thermostat may be maintained in operative engagement with the lever 13, by means of an adjustable sleeve nut 19, threaded onto the lower end 12$^a$ of said rod and having a coned or beveled upper end 19$^a$, in engagement with a seat 13$^a$, formed on the under side of said lever. By preference, this sleeve nut is provided with a scale ring 19$^b$ whereby adjustment of the same to regulate the length of the bar 12 in relation to the opening of the valve 15, may be effected with respect to an indicator point 12$^b$ carried by said bar 12.

In the inactive position, the valve 15 is held to its seat by the weight of the lever 13, assisted by a spring 20 interposed between the free end of said lever and the upper wall of the casing 8. The chamber 7 is provided with a relief valve 21, controlling discharge of excess pressure to the atmosphere; such valve being connected to a diaphragm 22, responsive to pressure within the chamber 7, and normally held to its seat by an adjustable spring 23, disposed in a vented casing 23$^a$ surmounting the casing 8. Any excess pressure within the chamber 7 may pass to the atmosphere via outlet pipe 24, when the valve 21, is raised from its seat by upward flexing of the diaphragm 22.

The manual control device for regulating the area of the orifice 18, is more clearly shown in Figs. 4 and 5. It comprises a pair of dials M' and M$^2$; the dial M' being provided with a scale indicating the amount of heating agent to be delivered in relation to the normal amount required to maintain the desired temperature in the room or other space to be heated, which may be 70° F., while the dial M$^2$ is provided with a scale indicating the limit of pressure which will be attained by the particular setting when the temperature surrounding the thermostat has reached some predetermined datum. These dials may be carried by a panel P, which also serves to support the dials 10 and 10$^a$, of a pressure sensitive device, more particularly referred to hereinafter. The dial M² includes as a part of its structure a body m, chambered at m'; such chamber having outlet ports m², and this portion of the body is disposed in an opening p, in the panel P, and provides for the exit of fluid, gas or liquid, entering said chamber m' for passage to the atmosphere or other exhaust point. In the form of structure illustrated in Fig. 5, a baffle P' is placed at the back of the panel so that air passing from the chamber m' will be muffled. The body m is internally threaded at 17ª to receive the end of the pipe 17, delivering fluid under pressure to the outlet port or orifice 18. The body of the dial M² may be held to the panel P by means of bolts n, with nuts n'; such means serving also to retain the baffle in position. The dial M' may be held to the panel by means of bolts o, and nuts o'.

The outlet port or orifice 18, of the manual control element M, consists essentially of a bushing 25, receiving discharge from the pipe 17; the pressure of such discharge being under control of means serving to vary the area of such outlet port, in conjunction with the opening of the valve 15, controlling the quantity of air delivered to such port. For the purpose of varying and thereby controlling the area of said outlet port or orifice 18, a stem 26 in axial alignment with and having a portion of its end fitting within the bore of the bushing 25, has a portion cut away, as indicated at 26ª, and the position of such cutaway portion of said stem 26, with respect to the cutaway portion 25ª of the bushing 25, regulates the size of the opening constituting the port 18, and determines the pressure at which the quantity of air admitted to the pipe 17 from the thermostatic chamber 7, via outlet opening 16, controlled by the valve 15, will pass to the atmosphere; such air entering the chamber m', and discharging freely to the atmosphere through the ports m²; space p around said body m, and past the baffle plate P' at the rear of the panel P.

The stem 26 of the manual control element M is provided with an operating handle or lever 27, and rotative movement imparted to said stem by means of this handle or lever adjusts the area of the port 25 through which the air passes on its way to the atmosphere, as clearly indicated in the diagrammatic views, Figs. 6, 7, 8, 9 and 10; Fig. 10, showing the closed position. The handle 27 serves as a pointer for indicating on the dial M' the percentage of normal heating load, and when in the position shown in Figs. 4 and 5, the outlet port or orifice 18 is fully open. A second handle or lever 29, movable with respect to the dial M² and the handle 27, is attached to a screw 30, movable in a threaded opening 31, formed in the body m of the manual control element, and through the rotation of such screw 30 the stem 26 may be drawn in or out to increase or decrease the width of the port or orifice 18, through which air from pipe 17 passes to the atmosphere, as indicated by the dotted lines, Fig. 5. The stem 26 may be maintained in proper position by means of a collar 32 pinned to the same, and a nut 32ª at its outer end. The handle 27 fits the polygonal end of the stem 26 and is frictionally held against accidental movement by a spring 33 within its head engaging a collar 34 which contacts with the handle 29. The handle 29 is fixed in its adjusted positions by screws 29ª, adapted to slots 29ᵇ, and such screws must be backed off before adjustment of said handle 29 can be effected. The handle 27 must also be removed to effect adjustment. The dial M² may carry stops 27ª to limit the movement of the handle 27 in both directions. The rotation of the stem 26 by the handle 27 affects the extent of the angular opening of the outlet port, while the rotation of the screw 30 changes the width of this port; each adjustment operating independently of the other to produce the conditions within the heating system or other fluid control in accordance with the positions of said handles 27 and 29 with respect to scale markings on the dials M' and M² of said manual control element.

The pressure of air produced and/or maintained in the pipe 17, as determined by the setting of the thermostatically controlled valve 15 and the manually controlled port 18, is the differences in pressure required in the heating mains above the pressure in the return mains under the then existing conditions of temperature surrounding the thermostat, when the thermostatically controlled valve and the manually controlled valve are properly coordinated and adjusted to the heating system to which the control device, as a whole, may be applied.

For the purpose of reproducing in the supply and return mains that difference in pressure already produced between the interior and exterior of pipe 17 through the agency of the manual control element and the thermostatically controlled valve, I may provide a motor H, including a flexible diaphragm 40, containing a body of fluid, gas or liquid, as may be preferred. Suspended from the main supply pipe A, is a casing 41, receiving a bellows chamber 40, which may be of the usual type, directly connected to the stem 42, of the main supply valve B, which in the present instance is shown as a single seated valve, normally closed by a weighted lever 43, which may be pivotally connected at 43ª to the end of the stem 42. This stem is operatively connected to the bellows operating element and the position of the latter is under the influence of motive fluid, gas or liquid, received via a pipe 44 from a pilot valve 45, which in turn receives such motive fluid via pipe 46 from a small pump 47, which may be connected to and operated by the shaft 5ª of the air compressor 5. Suitable connections are provided whereby overflow from such pilot valve may be returned by a pipe 48 to a reservoir or other chamber receiving the liquid raised by the pump, and a suitable valve 49, for relieving any excess pressure built up by the pump 47, is also provided. If a gas is used, air for instance, the supply delivered to the pilot valve may be taken from the compressor 5.

In the control arrangement shown in Fig. 1, the position of the pilot valve 45, shown more clearly in the sectional view, Fig. 12, is determined by the effect of four pressures operating upon pressure sensitive devices, which may be in the form of mercury balances, diaphragms, mercury floats, bellows structures, or other well known pressure sensitive devices; those indicated in Figs. 14 and 15, of the accompanying drawings being of a well known form.

In the arrangement shown in Figs. 1, and 14, the pilot valve 45 is under the control of a pair of mercury balances, indicated generally at 50 and 51; each having a pair of chambers 50ª and 50ᵇ, and 51ª and 51ᵇ, respectively, supported at the ends of scale beams 52 and 53, hung from knife edge supports and having pressure connections through the flexible tubes 54 and 54ª, and 55 and 55ª, whereby the scale beams are permitted to move relatively to fixed pressure connections indicated at 56 and 56ª, and 57 and 57ª. The balance at one side, that indicated at 50, for instance, has one of its chambers, 50ª, open to the atmosphere via connection 56; while the pressure existing in the other chamber 50ᵇ, is the same as that delivered by the pipe 17, to the outlet port 18, of the manual control element M; such pressure being diverted to the chamber 50ᵇ, via pipe 56ª. The other mercury balance, that indicated at 51, is also provided with two chambers; one of which, indicated at 51ª, is in communication with the return line E, via pipe 57, while the other, indicated at 51ᵇ, is in communication with some point on the discharge side of the main supply line A, via pipe 57ª, for instance. Any inequality in the differential pressure existing on each of the two mercury balances will react upon the connecting links 50ᶜ and 51ᶜ and lever 58, and raise or lower the pilot valve 45 from its normal position, at which point no flow either to or from the valve-controlling motor exists, to another position where oil or other liquid is permitted to flow into or out of the master-valve-controlling motor-chamber.

In the arrangement diagrammatically illustrated in Fig. 2, I have shown the application of my improved control apparatus to a condition wherein the return mains E are open to the atmosphere; in other words, such mains, while returning water of condensation directly or indirectly to the boiler, do so at atmospheric pressure, hence the differential in pressure desired between said supply main A and the return mains E (at atmosphere) is the same as the differential existing between the manual control discharge at the inlet to the port 18, and the atmospheric pressure. In such form of control, therefore, a single pressure sensitive device of the type illustrated in Fig. 14, may be employed to control the position of the pilot valve delivering motive fluid to the motor controlling the position of the master valve B. As the pressure at port 18, and the pressure in the supply mains of the heating system are the same in amount above atmospheric pressure, and neither of them are related to some third pressure, such as various degrees of vacuum or pressure in the return mains of the heating systems, the two first-named pressures may operate directly on one pressure sensitive device such as illustrated in Figs. 2 and 15, whose chambers 50ᵃᵃ and 50ᵇᵇ are opposed to and balanced to each other; which device in turn, through the link 50ᶜ and lever 58ª pivotally mounted at 58ᵇ, operates the pilot valve 45 to direct fluid to, or relieve it from, the motor for the master control valve B, in the same manner as indicated in Fig. 1, to maintain within the mains of the heating system a pressure substantially equal or in some definite relation to that on the inlet side of the controlled port 18. The pilot valve is held in its balanced or normal position by the action of a single mercury balance when the two pressures on said balance are equal, instead of being held to such normal position when the differences in pressure on two mercury balances operatively connected to the pilot valve are equal, as in the form of control apparatus illustrated in Figs. 1 and 14.

In lieu of the form of pressure sensitive devices illustrated in Figs. 14 and 15, I may employ the form of mercury balance illustrated in Fig. 16, which may consist of a scale beam 61, fulcrumed at 61ª, and carrying at each end mercury chambers 62 and 63. These chambers are connected through flexible connections 62ª and 63ª, at the bottom thereof, to permanently fixed mercury chambers 64 and 65, respectively, and at the top through flexible connections 62ᵇ and 63ᵇ, respectively, to permanently fixed pressure connecting chambers 66 and 67. The chambers 62 and 63 may be identical in size, as are the chambers 64 and 65.

When the same pressure difference exists between the chambers 64 and 66, and the chambers 65 and 67, the same differences in level will exist between the mercury in the chambers 62 and 64, and 63 and 65. The fixed chambers 64 and 66 are respectively connected to the low pressure and the high pressure points in a fluid circulating system, but when the low pressure point in the circulating system is the atmosphere, chamber 64 may be open to the atmosphere. The fixed chamber 67 is in communication with the steam line A', and the fixed chamber 65, which also contains a column of mercury, is in communication with the return line of the system which may be substantially at atmospheric pressure, or any other pressure occurring. If these pressure differences are not exactly equal, more mercury will remain in one of the floating chambers 62, or 63, as the case may be, than in the other, causing the heavy end of the scale beam 61 to deflect and operate a pilot valve $45^a$, whose stem $45^b$ is connected to the scale beam. A flat leaf spring 68, attached to the end of the scale beam and held normally in the horizontal position by set screws 69, resists this deflection so that a slight difference between the amounts of mercury in the chambers 62 and 63, will move the pilot valve very little and actuate a piston 70, disposed within a cylinder 71, and operatively connected to the main control valve B', in the main A', slowly, while a larger difference in the amounts of mercury in chambers 62 and 63, will effect considerable movement of the pilot valve and effect movement of the piston 70 with considerable rapidity. This feature of operation is of importance in reducing "hunting" or "sailing" of the control valve B. The fixed mercury columns 64 and 65 may be of such size that the motion of the mercury therein is relatively large so that if they are constructed of glass they may form gauge glasses to indicate pressures or pressure differences in the chambers to which they are connected.

The pilot valve $45^a$ is preferably of the balanced piston type, so constructed that a slight motion upward of the valve will permit oil to flow from a circulating pump 75 through the valve casing via passages $a$ and $b$, to the cylinder 71, and elevates the piston 70 therein. The pilot valve is normally adjusted so that it exactly covers port $b'$ of the valve casing, communicating with the passage $b$, when the scale beam is horizontal. A slight depression of the pilot valve will permit oil to flow from the cylinder 71, as the weight 76 depresses the piston 70, through the pilot valve casing, port $c'$, and passage $c$ to the oil receiving tank 77, where it is stored until again circulated by the pump 75. As this pump is in constant motion, I provide a by-pass $d$, whose discharge to the tank 77 may be regulated by a spring controlled valve 78, so that a constant pressure may be maintained on the pilot valve $45^a$ and thence to the piston to elevate the latter and permit opening of the master control valve B'.

Pipe $e$ receives leakage from a chamber $45^c$ in the upper part of the pilot valve casing and pipe $e'$ receives leakage from the chamber $45^d$ in the lower part of the pilot valve casing, thereby eliminating the necessity for providing stuffing boxes or other pressure-tight connections. The pilot valve $45^a$ may have an easy working fit in the valve casing. The cylinder 71 is conventional in design, and the piston 70 is packed by a cup leather $70^a$, and provided with a weight, indicated at 76, of sufficient gravity to lower said piston 70 when the pilot valve is in such position that fluid may flow from beneath said piston to the chamber of the pilot valve casing and thence via pipe $c$ to the oil receiver 77.

The main control valve, indicated at B', is preferably of the double-seated, balanced type, in the larger sizes, and may be operated by the piston 70 in the cylinder 71, either directly or through a chain 79, and lever $79^a$, as shown. The piston rod $70^b$ may be directly connected to the stem of the valve B' and operate directly on the valve, provided the form of the latter is such that a relatively large motion of the piston will produce small changes in steam delivery through said control valve B'. In smaller sizes, the valve may be of the single-seated, unbalanced type.

The mercury chamber 62 may be connected to a chamber in which the controlling pressure exists; compressed air for instance, and the mercury chamber 63 may be connected to a chamber in which the pressure to be controlled exists; the steam main A', for instance. In such case the connections at the top of chambers 64 and 65 are both open to atmospheric pressure, and the controlled pressure, (steam), will be as much above atmospheric pressure as the controlling pressure, (compressed air), is above atmospheric pressure. If the connections from chambers 62 and 64 are taken to two chambers between which the desired difference in pressure exists, and the chambers 63 and 65 are connected to two chambers between which it is desired to maintain the same difference in pressure as exists between chambers 62 and 64, then the device will operate to maintain the same differential between chambers 63 and 65, as exists between chambers 62 and 64; maintaining the same difference in the chambers to which they connect.

In Figs. 17 and 18, I have shown modified forms of control mechanism within the scope of my invention, in which a thermostatically controlled valve arranged to operate in a manner somewhat different from that disclosed in Figs. 1 and 2, is employed, and in which a pressurestat may be employed as the motor means for actuating a master control valve, located in the supply main.

In the arrangement shown in Fig. 17, the thermostatically operated valve controls the supply of liquid entering a standpipe, and a fixed orifice controls the discharge. In Fig. 18, this arrangement is reversed, the thermostatically operated valve shown therein controlling the discharge from the bottom of a standpipe, while a fixed orifice controls the admission of liquid to the top of such standpipe. Either form will produce variations in head in the standpipe, substantially equal to the square of the variations in outside temperature.

In Fig. 17, I provide a reservoir or tank for a body of liquid, preferably oil; such reservoir having a standpipe in communication therewith which provides a head of liquid whose variations controlled by the adjustable orifice of the manual control device and the degree of opening of the thermostatic valve, is transmitted to a pressurestat serving as a motor to operate a master control valve, indicated at $B^2$, and located in a supply main, indicated at $A^2$. The supply tank or reservoir indicated at 80, contains a pump 81, which may be of the gear type, operated by a motor 82; said pump discharging liquid via pipe 83, to a chamber 84, whose outlet 85 is under the control of a thermostatically operated valve 86. Any excess liquid delivered by the pump 81, to the chamber 84 and not discharged through outlet 85, controlled by the valve 86, is returned by a relief valve 87, to the reservoir 80, and serves to maintain a relatively constant pressure on said chamber 84. The thermostat, which may be of the usual bellows type, indicated at 88, is located at any convenient point with respect to outside or inside temperature conditions, and in the present instance it is shown as positioned to operate the valve 86 in a vertical direction.

The chamber 84 is located at the upper end of a standpipe 89, and has maintained within it a relatively constant pressure through the action of the relief valve 87, permitting the excess oil delivered by the pump 81 to be discharged from pipe 83 to the reservoir 80. The opening of valve 86, controlled by the thermostat 88, determines the quantity of liquid discharged from chamber 84 to the standpipe 89, and the area of the outlet port or orifice $18^a$, in the manual control device M, determines the pressure of head with which such quantity of liquid will be discharged through said port or orifice $18^a$, via pipes 90 and 91, from the standpipe 89 to the reservoir 80, where it is stored until again circulated by the pump 81.

A pipe 92 leading from the lower part of the standpipe 89, communicates with a chamber 93 above a diaphragm 94, while a chamber 95, below said diaphragm 94 is in communication with a pipe 97 leading from the tank or reservoir 80. Differences in the head of liquid in the tank and standpipe affect the position of the diaphragm 94. The diaphragm 94 is connected by a stem 98 to a diaphragm 99, disposed in a casing 100; the lower side of said diaphragm 99 being under the influence of pressure from the supply main $A^2$, on the discharge side of the master valve $B^2$, via pipe 101 and drum 102. In lieu of a stuffing box for the stem 98, I provide a bellows section 103, between the chamber 95, and said stem 98. The two diaphragms 94 and 99, connected in the manner described, constitute a pressurestat for controlling the position of said master valve $B^2$. For this purpose, the stem 98, connecting said diaphragms is connected at 105, to a lever 106, fulcrumed at 107, and connected at its opposite end to a chain 108, which may pass over suitable sheaves 109; the opposite end of said chain being attached to a lever 110, to which the stem 42 of said master valve $B^2$ is connected, and the latter lever being fulcrumed at the point 111. As will be understood, therefore, the pressurestat is responsive to the variations in pressure which exist in the body of liquid acting upon both sides of the upper diaphragm 94, and the pressure of the heating medium acting on the lower diaphragm 99; effecting control of said master valve $B^2$ accordingly.

In the arrangement disclosed in Fig. 18, as in that shown in Fig. 17, I provide a reservoir or tank for a body of liquid, preferably oil; such reservoir having a standpipe adjacent thereto which provides a head of liquid whose variations controlled by the adjustable orifice of the manual control device and the degree of opening of the thermostatic valve, is transmitted to a pressurestat serving as a motor to operate the main control valve here indicated at $B^3$, and located in a supply main, indicated at $A^3$. In Fig. 18, a supply tank or reservoir indicated at $80^a$, contains a gear pump $81^a$, operated by a motor $82^a$; said pump discharging liquid from said reservoir, via a pipe $83^a$, to the outlet port or orifice of the manual control element M, indicated at $18^b$, and thence back to the reservoir via pipe $84^a$. The reservoir $80^a$, has a bottom inlet $85^a$, under the control of a thermostatically operated valve $86^a$. The thermostat, which may be of the bellows-folded type like that shown in Fig. 17, is indicated at $88^a$, and may be located at any convenient point with respect to outside or inside temperature conditions, and may also be arranged to operate the valve $86^a$ in a vertical direction.

The liquid discharged from the chamber $m'$ of the manual control device via pipe $84^a$ enters the upper end of a vented standpipe $89^a$, and such liquid passes from said standpipe to the reservoir $80^a$, through the inlet opening $85^a$, controlled by the valve $86^a$. The pump $81^a$ is in constant motion; hence there is constant circulation between the tank, the manual control device, and the standpipe. A relief valve $87^a$, discharges excess fluid delivered by the pump and not discharged through pipe 83ª, to the reservoir 80ª, and maintains a relatively constant pressure on the orifice 18ᵇ.

As in the arrangement shown in Fig. 17, a pipe 92 leading from the lower part of the standpipe 89ª communicates with a chamber 93, above a diaphragm 94, while a chamber 95, below said diaphragm 94, is in communication with a pipe 97, leading from the tank or reservoir 80ª, said diaphragm 94, constituting part of a pressurestat of the same character as that illustrated in Fig. 17, which operates the master control valve, indicated at B³, and located in the main A³, in the same manner as in the arrangement illustrated in Fig. 17.

It is the function of the control system herein described to determine the difference in pressure between the supply and return mains of the heating system necessary to deliver proper quantities of steam to the various units of radiation, and further to produce this pressure difference between the supply and return mains of the heating system.

Assuming, for example, that the interior of a building is being maintained at a temperature of 70° F. with an external temperature at or about freezing point (32° F.) a certain amount of the heating medium is passing into the various units of radiation. If the temperature drops to zero (0° F.), it will be necessary to change the delivery of the heating medium in order to maintain the desired internal temperature with the lowered external temperature. As may be well understood, the difference between the external temperature and the desired internal temperature is such that the amount of heating required when external temperature is at the freezing point, (32° F.) will be less than that required should the external temperature drop to zero. At 32° F., externally, approximately one-half of the maximum delivery of heating medium would be required to maintain the building at or about 70°.

Referring to the control apparatus shown in Fig. 1, the bar 12 of the thermostat will have contracted under the lower temperature more than the bars 11 which support the bar 12, and such contraction will raise the valve 15 permitting an increased flow of air through pipe 17 for passage to and discharge through the manually controlled orifice 18. When the external temperature rises, this operation is reversed; bar 12 expanding more than supporting bars 11 and lowering the valve 15; thereby reducing the air flow through pipe 17.

The passage of such quantity of air through the orifice 18 of the manual control on its way to the atmosphere, results in the production of an air pressure within said pipe 17 proportional to the square of the quantity of air flowing; the square of the motion of the thermostat, and to the square of the changes in the temperature immediately surrounding the thermostat; the difference in pressure between said pressure in the pipe 17 and the atmosphere, produced by the proper coordination of the thermostat parts and orifice 18, with the pipe friction and the orifices of the heating system, is the pressure difference that should be maintained between the supply and return mains of such heating system to deliver the proper quantities of heating medium to the various heating units at the varying external temperatures. It has been produced through the action of a thermostatically affected air circulating system, and may be modified by varying the size of the orifice 18 to vary the heat delivered to the various radiating units according to the operating attendant's judgment of the unusual weather conditions, such as high winds, clouds, etc. The air circulating system has then completed is function of transmitting the thermostatic effect from the outdoor or external temperature to the control station; producing a pressure difference proportional to the square of this effect which is now impressed upon or applied to the pressure sensitive elements, and such air is then discharged through the orifice 18 and dissipated to the atmosphere.

The pressure produced in pipe 17 is transmitted through tube 56ª to the chamber 50ᵇ of a mercury balance 50; the other chamber 50ª being open to the atmosphere, and the mercury balance therefore takes a position proportionate to the air pressure in pipe 17. This mercury balance is connected to a pilot valve 45, which it' operates in conjunction with the second mercury balance 51 through lever 58; said pilot valve controlling the passage of motive fluid to motor means operating the main valve controlling the main steam supply, and being so designed that it closes the port in communication with the pipe 44 in communication with the chamber 41 which operates valve B, when the amount of steam supplied through pipe A, maintains such a pressure difference relation between the return and supply mains of the heating system that the two mercury balances 50 and 51 will be moved to the same extent.

When the pressures acting upon the two mercury balances are not equal, one end of the lever 58 will be raised or lowered to alter the flow of fluid through pilot valve 45, and pipe 44, to chamber 41; resulting in a variation in the opening of valve B and a change in the amount of steam delivered to the heating system until the pressure on the mercury balance 51 exactly equals the pressure on the mercury balance 50, when the pilot valve 45 will return to the position where it closes the opening to pipe 44, (see Fig. 12) and holds valve B in its new position.

The same condition obtains in the use of the control means shown in Fig. 16. Changes in temperature affect the pressures delivered to chambers 66 and 67, which react upon the bodies of mercury in the chambers 62 and 63 and tend to force a portion out of said chambers and into the fixed chambers 64 and 65. As either chamber 62 or 63 lightens in weight it will rise and the opposite chamber will lower; such operation moving the beam 61 and altering the position of the valve $45^a$. Changes in the position of the valve $45^a$ permit fluid, oil in this instance, to be added to or withdrawn from the chamber 71, thereby affecting the position of the piston 70 and, through the operative connections indicated, changing the position of the valve B'.

Should the (external) temperature lower, the pressure reacting upon the mercury in chamber 62 will shift the beam 61, and the valve $45^a$ will rise, oil will be delivered via passage $b$ to the chamber 71 below the piston 70, and the valve B' will open to a greater or less extent; depending upon the actual fall in degrees. Should the (external) temperature rise, the pressure reacting upon the mercury in chamber 63 will shift the beam 61, and the valve $45^a$ will lower, oil will be withdrawn from the chamber 71 via the passage $b$, the piston 70 will be lowered by the weight 76, and, through the operative connections indicated, the valve B' will be moved toward a closed position, or be closed altogether, depending upon the extent of the external temperature increase and the difference in pressures reacting upon the bodies of mercury in chambers 62 and 63, whereby the beam 61 is actuated.

In each case, the variable pressures delivered to the main A' will react upon the mercury chamber 63 until it balances the pressure acting upon chamber 62, whereupon the centre of the beam 61 will return to its original or neutral position; the valve $45^a$ will be restored to its neutral position, and the oil in the tank 77 will be simply circulated by the pump 75, without affecting the position of the piston 70.

In the control mechanism illustrated in Fig 17, a body of liquid is circulated through the orifice 85, past the thermostatically controlled valve 86, by the operation of the pump 81; such liquid passing from orifice 85 to standpipe 89, thence through pipe 90, orifice $18^a$ of the manual control device M, and pipe 91 to tank 80. In flowing through orifice $18^a$, a liquid head is built up represented by the difference in liquid levels between the standpipe 89 and tank 80, which head is equal to the pressure difference desired in the heating system under the then existing conditions of outside temperature affecting the thermostat 88, and the position of the lever 29 forming part of the manual control device M. In addition, the pressures exerted by the bodies of liquid in standpipe 89 and tank 80 act upon opposite sides of the diaphragm 94; passing to the chambers on opposite sides of said diaphragm via pipes 92 and 97 The resultant of this difference in pressures loads the diaphragm 99 so that valve $B^2$ is moved until the pressure in pipe $A^2$ exerts the same force upon diaphragm 99 as is exerted upon diaphragm 94 by the pressures in pipes 92 and 97.

The control mechanism illustrated in Fig. 18, differs from that illustrated in Fig. 17, in that the liquid, after it leaves pump 81, passes first to and through the orifice $18^b$ of the manual control device M, and thence through pipe $84^a$ to standpipe $89^a$ where it exerts a fluid pressure upon the thermostatically controlled valve $86^a$, and flows through orifice $85^a$ to tank $80^a$. In the arrangement shown in Fig. 17, the liquid flows first to the thermostatically controlled orifice 85, and thence through orifice $18^a$ of the manual control device M to tank 80.

I claim:

1. In a primary fluid controlling device, means for circulating a second fluid independently of the primary fluid, thermostatic means unaffected by the primary fluid or any product thereof for producing in said second fluid pressures having a definite relation to the temperature of the medium surrounding said thermostatic means, and a pressure sensitive device responsive to the pressure of said second fluid and the pressure of said primary fluid for controlling the flow of the latter.

2. In a primary fluid controlling device, means for circulating a second fluid independently of the primary fluid, thermostatic means unaffected by the primary fluid or any product thereof for producing in said second fluid pressures having a definite relation to the temperature of the medium surrounding said thermostatic means, manually controlled means for modifying the pressure of said second fluid, and a pressure sensitive device responsive to the pressure of the said second fluid and the pressure of said primary fluid for controlling the flow of the latter.

3. In a control device for regulating the flow of a primary fluid, a conduit therefor, a valve in said conduit, means for circulating a second fluid independently of the primary fluid, thermostatic means unaffected by the primary fluid or any product thereof for producing in said second fluid pressures having a definite relation to the temperature of the medium surrounding said thermostatic means, and a pressure sensitive device responsive to the pressure of said second fluid and the pressure of said primary fluid for controlling the position of the valve in the conduit for said primary fluid.

4. In a control device for regulating the flow of a primary fluid, a conduit therefor, a valve in said conduit, means for circulating a second fluid independently of the primary fluid, thermostatic means unaffected by the primary fluid or any product thereof for producing in said second fluid pressures having a definite relation to the temperature of the medium surrounding said thermostatic means, manually controlled means for modifying the pressure of said second fluid, and a pressure sensitive device responsive to the pressure of said second fluid and the pressure of said primary fluid for controlling the position of the valve in the conduit for said primary fluid.

5. In a heating system, means for circulating a fluid independently of the flow of the heating medium, a thermostatic device controlling the flow of said circulating fluid and regulating its pressure, and means for maintaining between two parts of the heating system the differential pressure produced between two points in the path of said circulating fluid.

6. In a heating system, means for circulating a fluid independently of the flow of the heating medium, a thermostatic device controlling the flow of said circulating fluid and regulating its pressure, means for maintaining between two parts of the heating system the differential pressure produced between two points in the path of said circulating fluid, and manually controlled means for modifying said last named differential pressure.

7. In means for controlling the pressure of a heating medium flowing through a main, the combination of such main, a master control valve mounted therein, means for causing flow of a pressure medium independently of the heating medium, pressure sensitive means responsive to the pressure of said independent medium and the pressure of said heating medium for operating said master control valve, and externally disposed thermostatic means unaffected by the heating medium for effecting variations in said independent pressure medium to which the means actuating said master control valve is responsive.

8. In means for controlling the pressure of a heating medium flowing through a main, the combination of such main, a master control valve mounted therein, a motor for operating said valve, a pilot valve controlling the operation of said motor, means for causing flow of a pressure medium independently of the heating medium, means responsive to variations in pressures of the respective mediums for operating said pilot valve, and thermostatic means unaffected by the heating medium for effecting variations in said independent pressure medium to which the means actuating said pilot valve is responsive.

9. In means for controlling the pressure of a heating medium flowing through a main, the combination of a source of compressed air, a valve through which such air pressure may be discharged at varying degrees, a thermostatic device responsive to temperature changes for controlling the position of said valve and varying the discharge therefrom, a master control valve controlling flow through said main, and means responsive to the differential between the pressure of air controlled by the position of said valve and the atmosphere for actuating said master control valve whereby the pressure in the main represents a degree coördinate with the temperature influencing the thermostat.

10. In means for controlling the pressure of a heating medium flowing through a main, the combination of a source of compressed air, a valve through which such air pressure may be discharged at varying degrees, a thermostatic device responsive to temperature changes for controlling the position of said valve and varying the discharge therefrom, a valve controlling flow through said main, a motor for operating the same, a pilot valve controlling the passage of motive fluid to said motor, and means responsive to the differential between the pressure of air controlled by the position of said valve and the atmosphere for actuating said motor whereby the pressure in the main represents a degree coördinate with the temperature influencing the thermostat.

11. In means for controlling the pressure of a heating medium flowing through a main for distribution to radiating elements, the combination of a source of compressed air, a valve through which such air pressure may be discharged in varying amounts, a thermostatic device responsive to temperature changes for controlling the opening and closing of said valve, manually controlled means for regulating the volume and pressure of air discharged through said valve, a master valve controlling flow through said heating main, a motor for operating said master valve, a pilot valve controlling the passage of motive fluid to said motor, and means responsive to the differential between the pressure of the air at the point of discharge and the atmosphere for actuating said pilot valve whereby the pressure in the main represents a supply of heating medium correlated to the temperature influencing the thermostat.

12. In a device for controlling the pressure of a heating medium, the combination of a main through which said heating medium passes for distribution to radiating elements, a source of compressed air, a thermostatically influenced valve controlling discharge thereof, a manually controlled device for regulating the amount of such discharge, and means responsive to the differential between the pressure at such discharge point and the atmosphere for controlling the pressure of the heating medium flowing in said main.

13. In a heating system, a conduit for the passage of a heating medium to a space to be heated, a valve controlling the rate of flow of heating medium in said conduit, means for causing flow of a fluid independently of the flow of the heating medium to affect the position of said valve, means responsive to temperature changes independent of said heating medium and unaffected thereby for varying the amount of such independent fluid passing under pressure to a point of discharge, and means for varying the pressure of such discharge independently of the variations produced by the temperature responsive means.

14. In a heating system, a conduit for the passage of a heating medium to a space to be heated, means for causing flow of a fluid under pressure independently of said heating medium, thermostatic means unaffected by the heating medium for controlling the passage of such fluid to a point of discharge; the pressure of such discharge controlling delivery of the heating medium, and means for varying the pressure of such discharge independently of the pressure effect produced by the action of the thermostatic means.

15. In a heating system, a conduit for the passage of a heating medium to a space to be heated, means for causing flow of an independent fluid under pressure, thermostatic means unaffected by the heating medium for controlling the passage of such fluid to a point of discharge; the pressure of such discharge controlling delivery of the heating medium, and manually operated means for controlling the pressure of such discharge independently of the pressure effect produced by thermostatic means.

16. In a heating system, the combination of a heat distributing unit, a source of heating medium for delivery thereto, a valve for controlling the delivery of said heating medium, a source of air under pressure delivering to a discharge outlet, manually operated means for regulating the discharge of such air, means responsive to temperature changes unaffected by the heating medium for varying the passage of such air independently of the manual control on its discharge outlet, and means whereby the rate of discharge of such air pressure may actuate the valve controlling the passage of said heating medium to the heat distributing unit.

17. In a heating system, a conduit for the passage of a heating medium, means for causing flow of a pressure medium independently of said heating medium, means responsive to the temperature exterior of the space to be heated for controlling the flow of said independent pressure medium, and a pressure sensitive device responsive to the pressure of said heating medium and the pressure of said independent medium for controlling the delivery of the heating medium whereby such delivery may be varied in small increments.

18. In a heating system, a conduit for the passage of a heating medium, a valve controlling the flow of heating medium in said conduit, means for circulating a fluid independently of the flow of the heating medium, means responsive to the temperature exterior of the space to be heated for controlling the flow of said circulating fluid at one point, manually controlled means for controlling the flow of said circulating fluid at another point, and means whereby the resultant pressure produced by such dual controlling means and the pressure of the heating medium affects the position of said valve whereby delivery of the heating medium to the space to be heated may be at a pressure correlated to the temperature exterior of such space.

19. In means for controlling the pressure of a heating medium flowing through a main for distribution to radiating elements, the combination of a source of compressed air, a valve through which such air pressure may be discharged in varying amounts, a thermostatic device responsive to temperature changes for controlling the opening and closing of said valve, manually controlled means for regulating the volume and pressure of air discharged through said valve, a master valve controlling flow through said heating main, a fluid-operated motor for actuating said master valve, a pilot valve controlling the passage of motive fluid to said motor, and means responsive to the differential between the controlled pressure of air at the point of discharge and the atmosphere for actuating the pilot valve controlling the passage of motive fluid to said motor whereby the pressure in the main represents a supply of heating medium correlated to the temperature influencing the thermostatic device.

20. The combination of a main for the passage of a heating medium, a source of compressed air, a conduit therefor open to the atmosphere, a thermostatically influenced valve controlling flow through said conduit to the point of discharge, manually operated means for regulating such discharge, and means responsive to the differential between the pressure at which such air is discharged and the atmosphere for controlling the pressure of the heating medium between the supply and return mains of the heating system.

21. In a steam heating system, the method of controlling the pressure differences between the supply and return mains of such system which consists in establishing a flow of fluid independently of the flow of a heating medium in said supply and return mains; said fluid being under pressure from a point of ingress to a point of discharge, thermostatically controlling the flow of said fluid at a point of ingress and additionally controlling the flow of said fluid at the point of discharge, and utilizing the pressure of the flowing medium to affect the pressure of the heating medium.

22. The method of supplying a heating medium at a rate of flow to produce a desired heating effect correlated with outdoor temperature changes, which consists in establishing a flow of fluid under pressure from a point of ingress to a point of discharge independently of the flow of the heating medium, thermostatically controlling the pressure of said flowing fluid at the point of ingress, utilizing the pressure of the flowing fluid to affect the pressure of said heating medium, and manually controlling said flowing fluid at the point of discharge.

23. In a steam heating system, the method of control which consists in establishing a force independently of the heating medium which varies as the outdoor temperature changes, establishing a second force proportional to the difference in pressure between the supply and return mains of the heating system, and utilizing said forces to vary the flow of said heating medium in the system.

24. In a steam heating system, the method of control which consists in establishing a force independently of the heating medium, thermostatically and manually varying such force, establishing a second force proportional to the difference in pressure between the supply and return mains of the heating system, and utilizing said forces to vary the flow of said heating medium in said system.

In witness whereof I have signed this specification.

KARL W. ROHLIN.